US008514110B2

(12) United States Patent
Takahashi (10) Patent No.: US 8,514,110 B2
(45) Date of Patent: Aug. 20, 2013

(54) RESOLVER DIGITAL CONVERTER (75) Inventor: Hisayoshi Takahashi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/513,451

(22) PCT Filed: Dec. 3, 2010

(86) PCT No.: PCT/JP2010/071667
§ 371 (c)(1),
(2), (4) Date: Jun. 21, 2012

(87) PCT Pub. No.: WO2011/068196
PCT Pub. Date: Jun. 9, 2011

(65) Prior Publication Data
US 2012/0256773 A1  Oct. 11, 2012

(30) Foreign Application Priority Data
Dec. 4, 2009 (JP) .................................. 2009-276416

(51) Int. Cl.
*H03M 1/48* (2006.01)
(52) U.S. Cl.
USPC ............................ 341/115; 341/144; 341/116
(58) Field of Classification Search
USPC .......................... 341/115, 116, 144, 155, 138
See application file for complete search history.

(56) References Cited

U.S. PATENT DOCUMENTS

| 3,976,869 A | * | 8/1976 | Stella et al. | ........................ 708/4 |
| 4,340,939 A | * | 7/1982 | Mayer | ................................. 708/4 |
| 5,079,549 A | * | 1/1992 | Liessner | ........................ 341/116 |
| 5,714,956 A | * | 2/1998 | Jahne et al. | .................... 341/155 |
| 7,382,299 B2 | * | 6/2008 | Hwang | ........................... 341/120 |
| 8,059,020 B2 | * | 11/2011 | Schatzberger | ............... 341/138 |

FOREIGN PATENT DOCUMENTS

| EP | 1835262 A2 | 9/2007 |
| JP | 61-61006 | 3/1986 |
| JP | 7-218288 | 8/1995 |
| JP | 2004-45286 | 2/2004 |
| JP | 2005-98735 | 4/2005 |
| JP | 2006-23146 | 1/2006 |
| JP | 2009-150826 | 7/2009 |

OTHER PUBLICATIONS

International Search Report for Application No. PCT/JP2010/071667, 4 pages, dated Mar. 15, 2011.
Supplementary European Search Report for Application No. 10834646.1, 6 pages, dated Mar. 18, 2013.

* cited by examiner

*Primary Examiner* — Jean B Jeanglaude
(74) *Attorney, Agent, or Firm* — Nelson Mullins Riley & Scarborough LLP; Anthony A. Laurentano (57) ABSTRACT

This resolver digital converter 10 includes a band pass processing unit that is disposed between a conversion unit and a multiplication unit and passes only a signal of a predetermined band through processing performed with a period that is shorter than the sampling period of an analog-to-digital converter and corrects the gains of digital signals before being input to the multiplication unit by using gain correction values that are set based on the maximum value and the minimum value of each one of digital signals passing through the band pass processing unit.

5 Claims, 7 Drawing Sheets

RESOLVER DIGITAL CONVERTER

RELATED APPLICATIONS

This application is a 35 U.S.C. 371 national stage filing of International Application No. PCT/JP2010/071667, filed Dec. 3, 2010, which claims priority to Japanese Patent Application No. 2009-276416 filed on Dec. 4, 2009 in Japan. The contents of the aforementioned applications are hereby incorporated by reference.

FIELD OF THE INVENTION

The present invention relates to a resolver digital converter.
Priority is claimed on Japanese Patent Application No. 2009-276416, filed Dec. 4, 2009, the content of which is incorporated herein by reference.

BACKGROUND ART

Conventionally, in a method of error corrections in an absolute position detecting device, for example, disclosed in Patent Document 1, an offset error, an amplitude error, and a phase error included in an analog output voltage are corrected by using digital values that are acquired through A/D conversion of analog output voltages of a sine wave and a cosine wave.

In addition, conventionally, for example, in a method of correcting a resolver, for example, disclosed in Patent Document 2, an offset error and an amplitude error included in an output signal having an analog value are corrected by using a digital output acquired by A/D conversion of an output signal output from the resolver.

PRIOR ART DOCUMENTS

[Patent Document 1] Japanese Unexamined Patent Application Publication No. 7-218288
[Patent Document 2] Japanese Unexamined Patent Application Publication No. 2004-045286

SUMMARY OF INVENTION

Problem to be Solved by the Invention

According to the above-described conventional techniques, the offset error and the amplitude error are corrected by using a maximum value and a minimum value of each digital signal of a sine wave and a cosine wave acquired through A/D conversion. However, due to an upper limit on the processing speed of the A/D conversion, there are cases where the shapes of analog signals of the sine wave and the cosine wave cannot be appropriately reproduced by the digital signals acquired through the A/D conversion. In such digital signals that are acquired through the A/D conversion in which the reproducibility of an analog signal is low, it is difficult to appropriately detect the maximum value and the minimum value. In addition, by using the maximum value and the minimum value having low detection accuracy, there is a problem in that the correction of the offset error and the amplitude error cannot be appropriately performed while desired accuracy is secured.

The present invention is devised in consideration of the above-described situations, and an object is to provide a resolver digital converter capable of improving the reproducibility of the shape of an analog signal output from a resolver.

Means for solving the Problem

The present invention employs the following means so as to achieve the object relating to solving the above-described problems.

(1) A resolver digital converter according to an aspect of the present invention is a resolver digital converter that converts a detection signal that is an analog signal output from a resolver that detects rotation of a rotor into a signal of a digital angle, the resolver digital converter including: an analog-to-digital converter that converts a resolver sine value signal and a resolver cosine value signal, which are the detection signals, and an excitation signal of the resolver, which is an analog signal, into digital signals; a conversion unit that converts the signal of the digital angle into a sine value signal and a cosine value signal; a multiplication unit that calculates a first multiplication value signal by multiplying the resolver sine value signal converted into the digital signal by the analog-to-digital converter and the cosine value signal of the digital angle together and calculates a second multiplication value signal by multiplying the resolver cosine value signal converted into the digital signal by the analog-to-digital converter and the cosine value signal of the digital angle together; a subtraction unit that calculates a subtraction value signal by subtracting the second multiplication value signal from the first multiplication value signal; a synchronous detection unit that performs synchronous detection of the subtraction value signal by using the excitation signal and outputs a detection signal acquired through the synchronous detection; a control unit that adjusts the digital angle such that the detection signal is zero; a band pass processing unit that is disposed between the analog-to-digital converter and the multiplication unit and performs band pass processing, in which only a signal of a predetermined band out of the digital signal is passed, with a period that is shorter than a sampling period of the analog-to-digital converter; and a correction unit that sets gain correction values based on a maximum value and a minimum value of each one of digital signals of the resolver sine value signal and the resolver cosine value signal that have passed the band pass processing unit, corrects gains of the digital signals of the resolver sine value signal and the resolver cosine value signal by using the gain correction values, and outputs the digital signals to the multiplication unit.

(2) In addition, in the resolver digital converter described in (1) described above, the band pass processing unit may serve as the correction unit.

(3) In addition, in the resolver digital converter described in (1) described above, a processing unit that sets the gain correction values may be further included.

(4) In addition, in the resolver digital converter described in (3) described above, the processing unit may calculate a delay correction value corresponding to gain correction values, and the delay correcting unit that corrects the signal of the digital angle by using the delay correction value may be further included.

(5) In addition, in the resolver digital converter described in (1) described above, a band pass processing unit for the excitation signal that is disposed between the analog-to-digital converter and the synchronous detection unit and performs band pass processing, in which only a signal of a predetermined band out of the excitation signal is passed, with a period that is shorter than the sampling period of the analog-to-digital converter may be further included.

Effects of the Invention

According to the resolver digital converter described in (1) described above, the band pass processing unit passes only a signal of a predetermined band out of a digital signal. Accordingly, DC components included in digital signals, that is, errors due to offsets included in the detection signals that are analog signals output from the resolver can be appropriately eliminated.

In addition, by performing the band pass processing with a period that is shorter than the sampling period of the analog-to-digital converter, even in a case where the reproducibility of the shapes of detection signals that are analog signals output from the resolver is low in digital signals after the A/D conversion, the reproducibility of the shapes of analog signals output from the resolver in the digital signals that have passed through the band pass processing unit can be improved.

Accordingly, by configuring the digital signals to pass through the band pass processing unit, since digital signals having high reproducibility are acquired, the maximum value and the minimum value can be detected with high accuracy. Therefore, the gain correction values is set by using the maximum value and the minimum value having high detection accuracy while securing desired accuracy. Accordingly, the error in the digital angle is appropriately decreased. In other words, the correction of the amplitude errors (that is, the correction of gains of the digital signals) can be appropriately performed. Thus, for example, it can be prevented to increase the cost required for configuring the device that is caused due to an increase in the accuracy that is necessary for devices such as the resolver and the analog-to-digital converter, accordingly the accuracy of the digital angle can be improved.

According to the resolver digital converter described in (2) described above, since the band pass processing unit serves as the correction unit, the band pass processing unit passes only a signal of a predetermined band and corrects the gains of the digital signals. Therefore, the processing of the digital signals can be performed at higher speed.

According to the resolver digital converter described in (3) described above, since the processing unit that sets the gain correction values is included separated from the correction unit, in the processing unit, many functions such as outputting the phase of each digital signal in the processing unit and the like can be included. Therefore, the reproducibility of the shapes of analog signals that are output from the resolver can be further improved.

There is a case where a delay occurs as the signal of the digital angle passes through band pass processing. In such a case, according to the resolver digital converter described in (4) described above, the processing unit calculates a delay correction value, and the signal of the digital angle is corrected by the delay correcting unit. Therefore, the accuracy of the digital angle can be further improved.

In addition, according to the resolver digital converter described in (5) described above, similarly to the detection signal output from the resolver, by performing the band pass processing also for the excitation signal, synchronous detection can be performed while resolving the phase deviation between the detection signal and the excitation signal, accordingly the accuracy of the digital angle can be improved.

DESCRIPTION OF EMBODIMENTS

Hereinafter, a resolver digital converter according to an embodiment of the present invention will be described with reference to the accompanying drawings.

Figure 1:
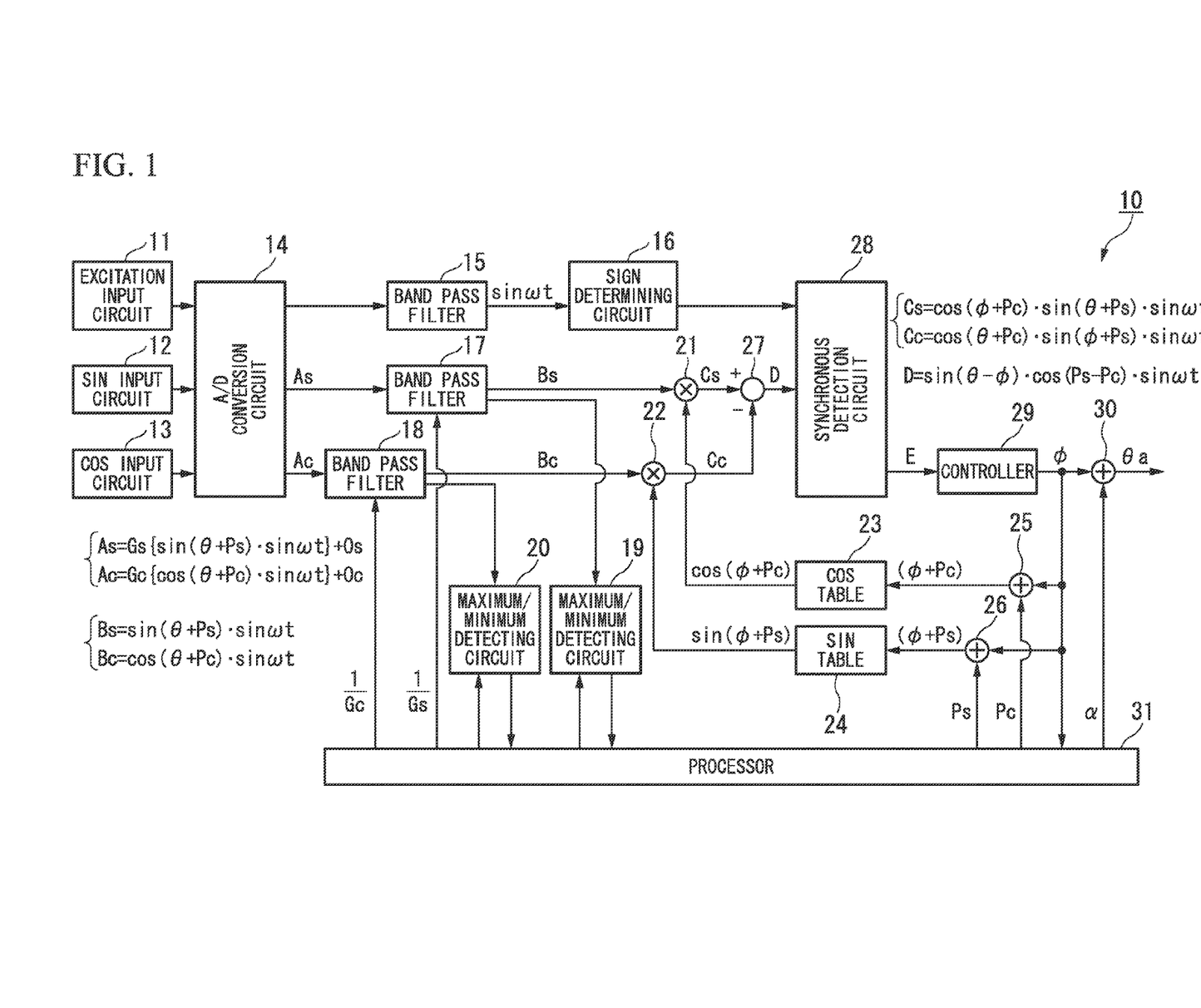
FIG. 1 is a configuration diagram of a resolver digital converter according to an embodiment of the present invention.

The resolver digital converter 10 according to this embodiment converts a detection signal output from a resolver 1, for example, of a one phase excitation—two phase output type or the like into a signal of a digital angle. This resolver digital converter 10, for example, as shown in FIG. 1, is configured to include: an excitation signal input circuit 11; a resolver sine value signal (SIN) input circuit 12; a resolver cosine value signal (COS) input circuit 13; an analog-to-digital (A/D) conversion circuit (analog-to-digital converter) 14; a band pass filter (band pass processing unit) 15 for an excitation signal; a sign determining circuit 16; first and second band pass filters (a band pass processing unit and a correction unit) 17 and 18 for a detection signal; first and second maximum/minimum detecting circuits 19 and 20; first and second multiplication units 21 and 22; a cosine value conversion unit 23; a sine value conversion unit 24; first and second addition units 25 and 26; a subtraction unit 27; a synchronous detection circuit (synchronous detection unit) 28; a controller 29; a delay correcting unit 30; and a processor (processing unit) 31.

Figure 2:
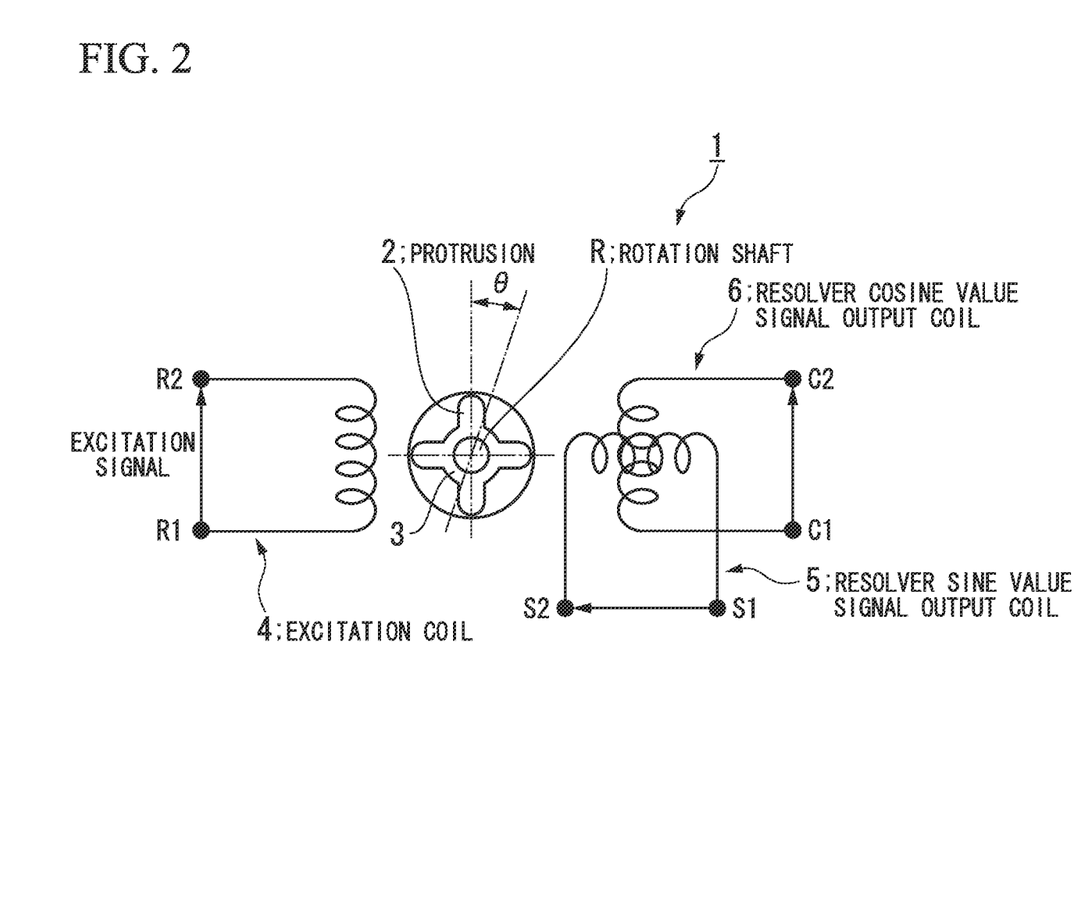
FIG. 2 is a configuration diagram of a resolver according to the embodiment.

The resolver 1, for example, as shown in FIG. 2, includes a resolver rotor (rotary machine) 3 and a resolver stator (not shown in the figure).

The resolver rotor 3 includes salient poles 2 that are fixed to the rotation shaft R of a rotary machine (not shown in the figure) such as a motor. The resolver stator includes an excitation coil 4, a resolver sine value signal output coil 5, and a resolver cosine value signal output coil 6. The resolver 1 is arranged such that the two output coils 5 and 6 have a phase difference of 90°.

Figure 3:
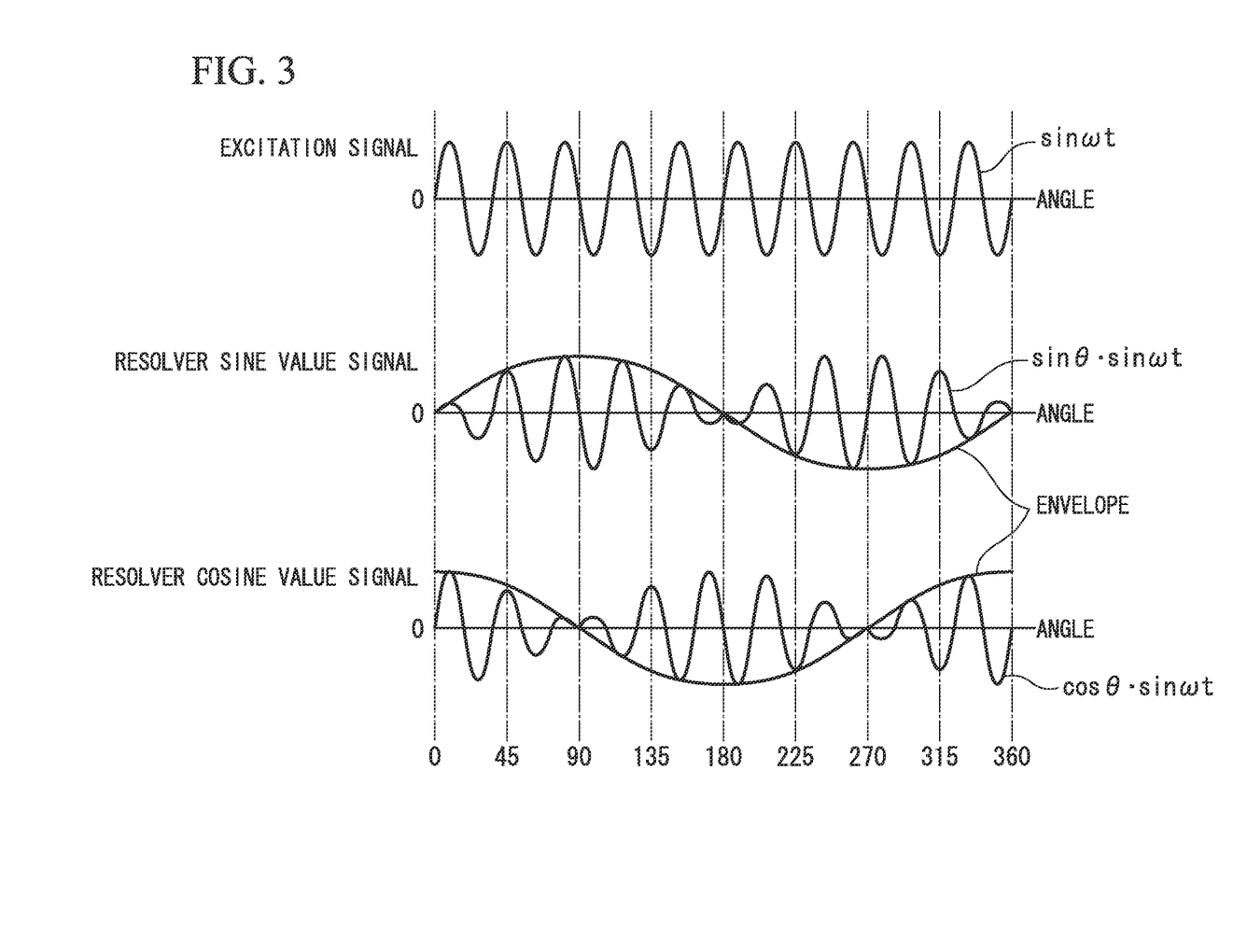
FIG. 3 is a diagram illustrating an example of detection signals (a resolver sine wave and a resolver cosine wave) output from the resolver according to the embodiment and an excitation signal applied to the resolver.

In principle, for example, as shown in FIG. 2 and FIG. 3, when an excitation signal ($\sin \omega t$) is applied to the excitation coil 4 of the resolver 1, a resolver sine value signal ($\sin \theta \cdot \sin \omega t$) and a resolver cosine value signal ($\cos \theta \cdot \sin \omega t$) having voltage amplitudes according to the rotation angle $\theta$ in the output coils 5 and 6 in accordance with the rotation (that is, the rotation of the rotation shaft R of the rotary machine) of the resolver rotor 3. The excitation signal ($\sin \omega t$) is a signal of an excitation voltage of which the voltage amplitude is configured by a sine wave having an angular velocity of $\omega$.

The excitation signal input circuit 11 outputs an excitation signal, which is an analog signal applied to the excitation coil 4 of the resolver 1, so as to be input to the analog-to-digital (A/D) conversion circuit 14.

The resolver sine value signal (SIN) input circuit 12 outputs a resolver sine value signal, which is a detection signal output from the resolver 1 and is an analog signal excited in the resolver sine value signal output coil 5. The resolver sine value signal (SIN) input circuit 12 inputs the resolver sine value signal to the analog-to-digital (A/D) conversion circuit 14.

The resolver cosine value signal (COS) input circuit 13 outputs a resolver cosine value signal, which is a detection signal output from the resolver 1 and is an analog signal excited in the resolver cosine value signal output coil 6. The resolver cosine value signal (COS) input circuit 13 inputs the resolver cosine value signal to the analog-to-digital (A/D) conversion circuit 14.

The analog-to-digital (A/D) conversion circuit 14 converts (A/D conversion) analog signals, which are output from the input circuits 11, 12, and 13 and are input to the analog-to-digital (A/D) conversion circuit 14, into digital signals. In addition, the analog-to-digital (A/D) conversion circuit 14 outputs the converted digital signals and inputs them to the band pass filters 15, 16, and 17.

The band pass filter 15, for example, performs processing with a period shorter than the sampling period of the analog-to-digital (A/D) conversion circuit 14 and performs a band pass processing in which only a signal of a predetermined band out of a digital signal of an excitation signal is passed. Then, the band pass filter 15 outputs the digital signal of the excitation signal for which the band pass processing and inputs the digital signal to the sign determining circuit 16.

The sign determining circuit 16 determines the sign of the excitation signal that is output from the band pass filter 15 and is input to the sign determining circuit 16; outputs the determination result; and input it to the synchronous detection circuit 28.

The first band pass filter 17 for a detection signal is disposed between the analog-to-digital (A/D) conversion circuit 14 and the first multiplication unit 21 and performs band pass processing in which only a signal of a predetermined band out of a digital signal of a resolver sine value signal (As) output from the analog-to-digital (A/D) conversion circuit 14 is passed.

The second band pass filter 18 for a detection signal is disposed between the analog-to-digital (A/D) conversion circuit 14 and the second multiplication unit 22, and performs band pass processing in which only a signal of a predetermined band out of a digital signal of a resolver cosine value signal (Ac) output from the analog-to-digital (A/D) conversion circuit 14 is passed.

The digital signals of the resolver sine value signal (As) and the resolver cosine value signal (Ac) output from the analog-to-digital (A/D) conversion circuit 14, for example, are represented by the following Equation (1) due to errors in the offset, the gain, and the phase included in a detection signal output from the resolver 1. Here, Os and Oc are DC components of digital signals of the resolver sine value signal (As) and the resolver cosine value signal (Ac), Gs and Gc are the gains Gs and Gc of the digital signals, and Ps and Pc are the phases of the digital signals.

$$As = Gs\{\sin(\theta+Ps)\cdot\sin\omega t\} + Os \quad \text{[Equation 1]}$$

$$Ac = Gc\{\sin(\theta+Pc)\cdot\sin\omega t\} + Oc \quad (1)$$

The first and second band pass filters 17 and 18 eliminate DC components Os and Oc included in the digital signals, that is, errors due to an offset included in a detection signal that is output from the resolver 1 by performing the band pass processing.

In addition, in the first and second band pass filters 17 and 18, band pass processing is performed. In particular, for example, the processing is performed with a period shorter than the sampling period of the analog-to-digital (A/D) conversion circuit 14. Accordingly, in the A/D conversion of the analog-to-digital (A/D) conversion circuit 14, even in a case where the reproducibility of the shapes of detection signals output from the resolver 1 is low, the reproducibility of the shapes of the detection signals output from the resolver 1 can be improved through the band pass processing.

Figure 4:
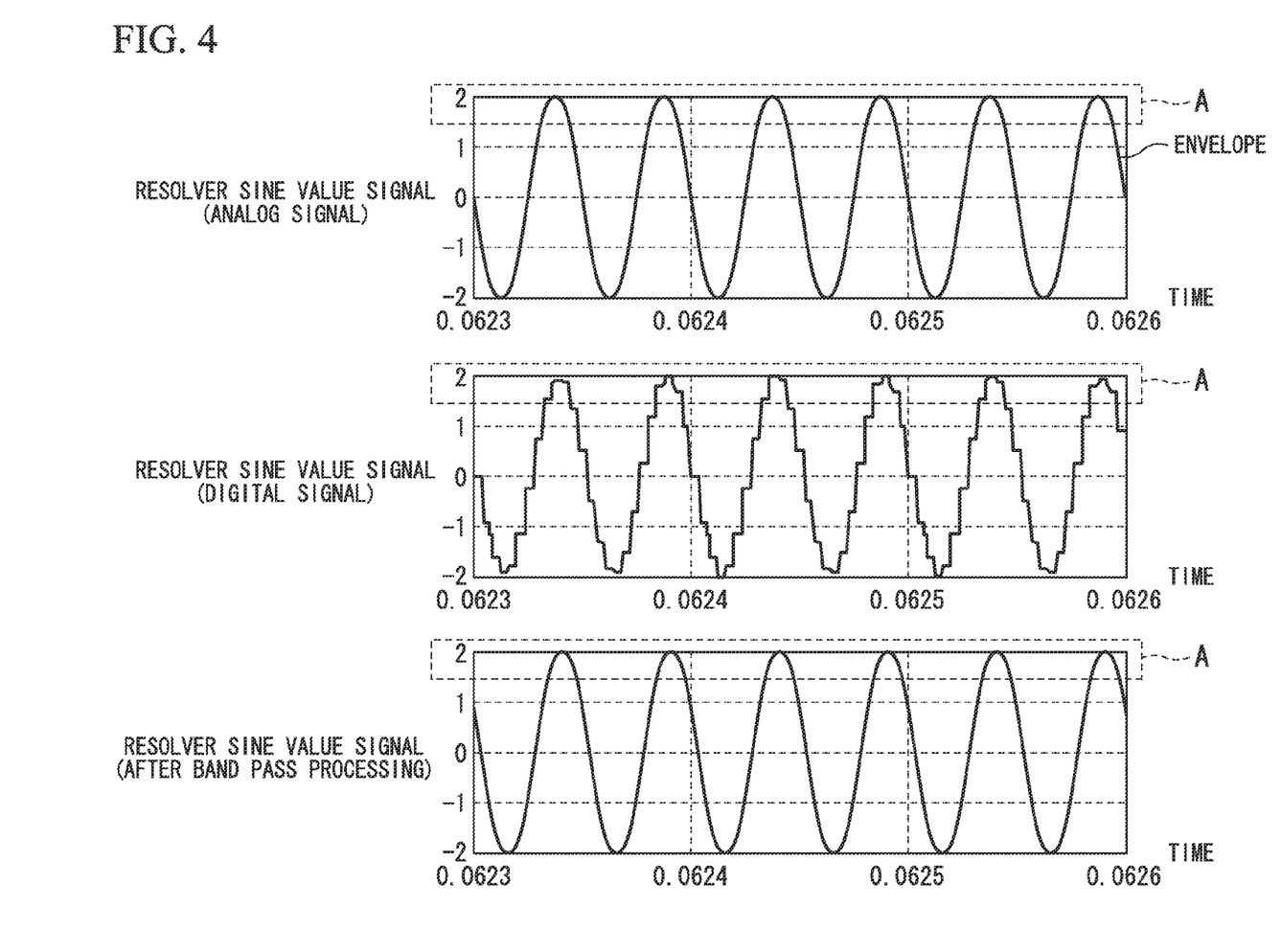
FIG. 4 is a diagram illustrating an example of an analog signal output from the resolver, a digital signal output from an analog-to-digital (A/D) conversion circuit, and a digital signal output from a first band pass filter out of a resolver sine wave signal according to the embodiment.
Figure 5:
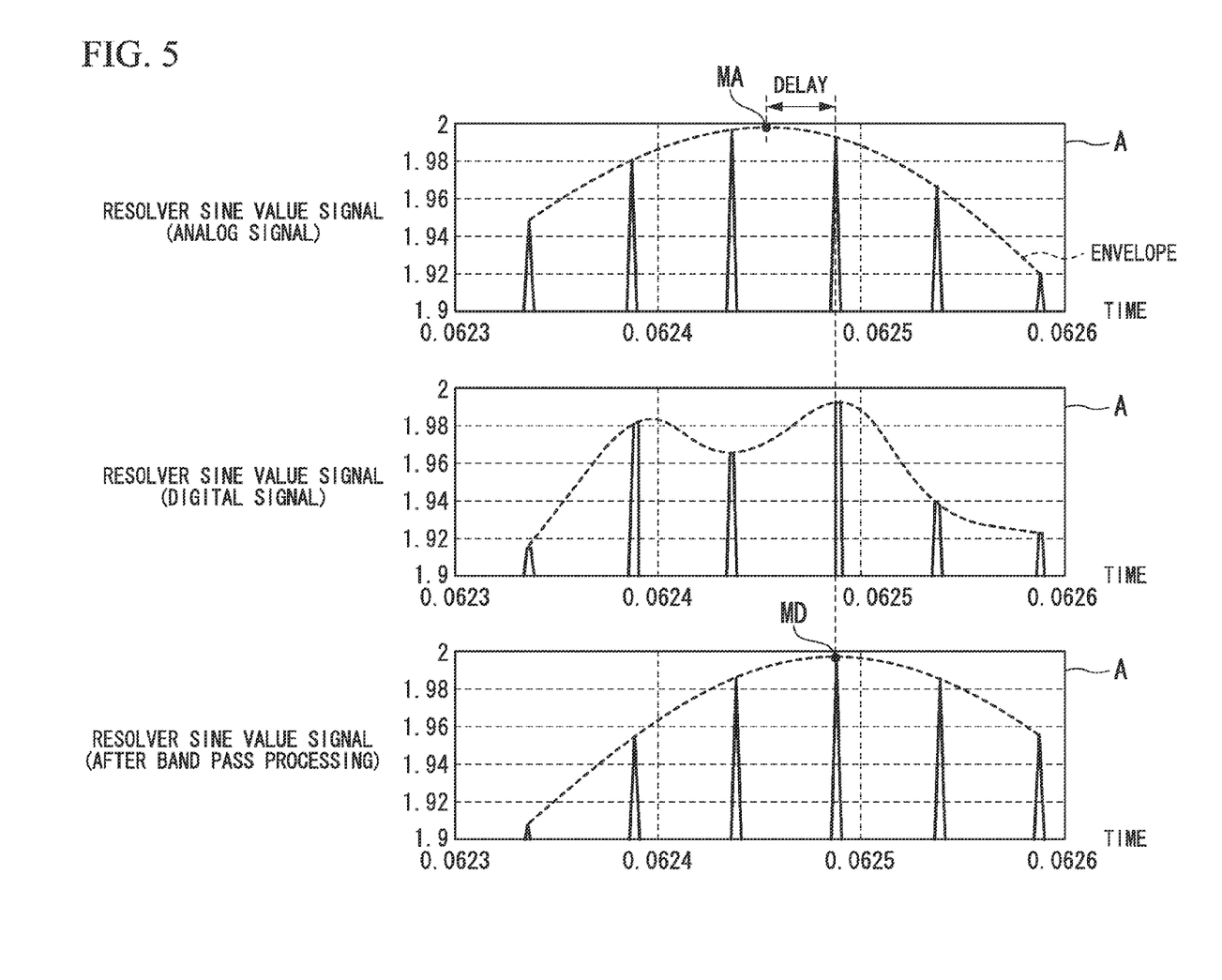
FIG. 5 is a diagram illustrating region A shown in FIG. 4 in an enlarged scale.

For example, as shown in FIGS. 4 and 5, due to the long sampling period of the sampling period of the A/D conversion, there is a case where the shapes of the digital signals of the resolver sine value signal and the resolver cosine value signal after the A/D conversion cannot reproduce the shapes of analog signals of the resolver sine value signal and the resolver cosine value signal, which are detection signals output from the resolver 1, at a desired degree of coincidence.

In contrast to this, by performing the band pass processing with a period shorter than the sampling period of the A/D conversion, the reproducibility of the signal shapes of digital signals corresponding to analog signals can be improved. In addition, the shapes of digital signals of the resolver sine value signal and the resolver cosine value signal after the band pass processing and the shapes of analog signals of the resolver sine value signal and the resolver cosine value signal output from the resolver 1 can be allowed to coincide with each other with high accuracy.

The first band pass filter 17 performs a gain correcting process in which the gain Gs of the digital signal of the resolver sine value signal (As) that is output from the analog-to-digital (A/D) conversion circuit 14 is corrected by using a gain correction value (1/Gs) that is output from the processor 31 to be described later.

Furthermore, the second band pass filter 18 performs a gain correcting process in which the gain Gc of the digital signal of the resolver cosine value signal (Ac) that is output from the analog-to-digital (A/D) conversion circuit 14 is corrected by using a gain correction value (1/Gc) that is output from the processor 31 to be described later.

Accordingly, the first and second band pass filters 17 and 18 eliminate differences in the gains Gs and Gc of the digital signals of the resolver sine wave (As) and the resolver cosine value signal (Ac) output from the analog-to-digital (A/D) conversion circuit 14, that is, an error due to the gain of the detection signal output from the resolver 1.

The first and second band pass filters 17 and 18 output a sine value signal (Bs) and a cosine value signal (Bc), for example, represented in the following Equation (2) so as to be input to the first and second multiplication units 21 and 22. These digital signals BS and Bc signals are signals, which are acquired by performing the band pass processing and the gain correcting process for the digital signals of the resolver sine value signal (As) and the resolver cosine value signal (Ac) that are output from the analog-to-digital (A/D) conversion circuit 14, having the same amplitudes as those of the resolver sine value signal and the resolver cosine value signal.

Furthermore, the first and second band pass filters 17 and 18 output digital signals of the resolver sine value signal and the resolver cosine value signal acquired by performing only the band pass processing for digital signals of the resolver sine value signal (As) and the resolver cosine value signal (Ac), which are output from the analog-to-digital (A/D) conversion circuit 14, so as to be input to the first and second maximum/minimum detecting circuits 19 and 20. The digital signals of the resolver sine value signal and the resolver cosine value signal described here are signals acquired by eliminating the DC components Os and Oc from the digital signals As and Ac represented in Equation (1) described above.

$$Bs=\sin(\theta+Ps)\cdot\sin \omega t \quad \text{[Equation 2]}$$

$$Bc=\cos(\theta+Pc)\cdot\sin \omega t \quad (2)$$

Figure 6:
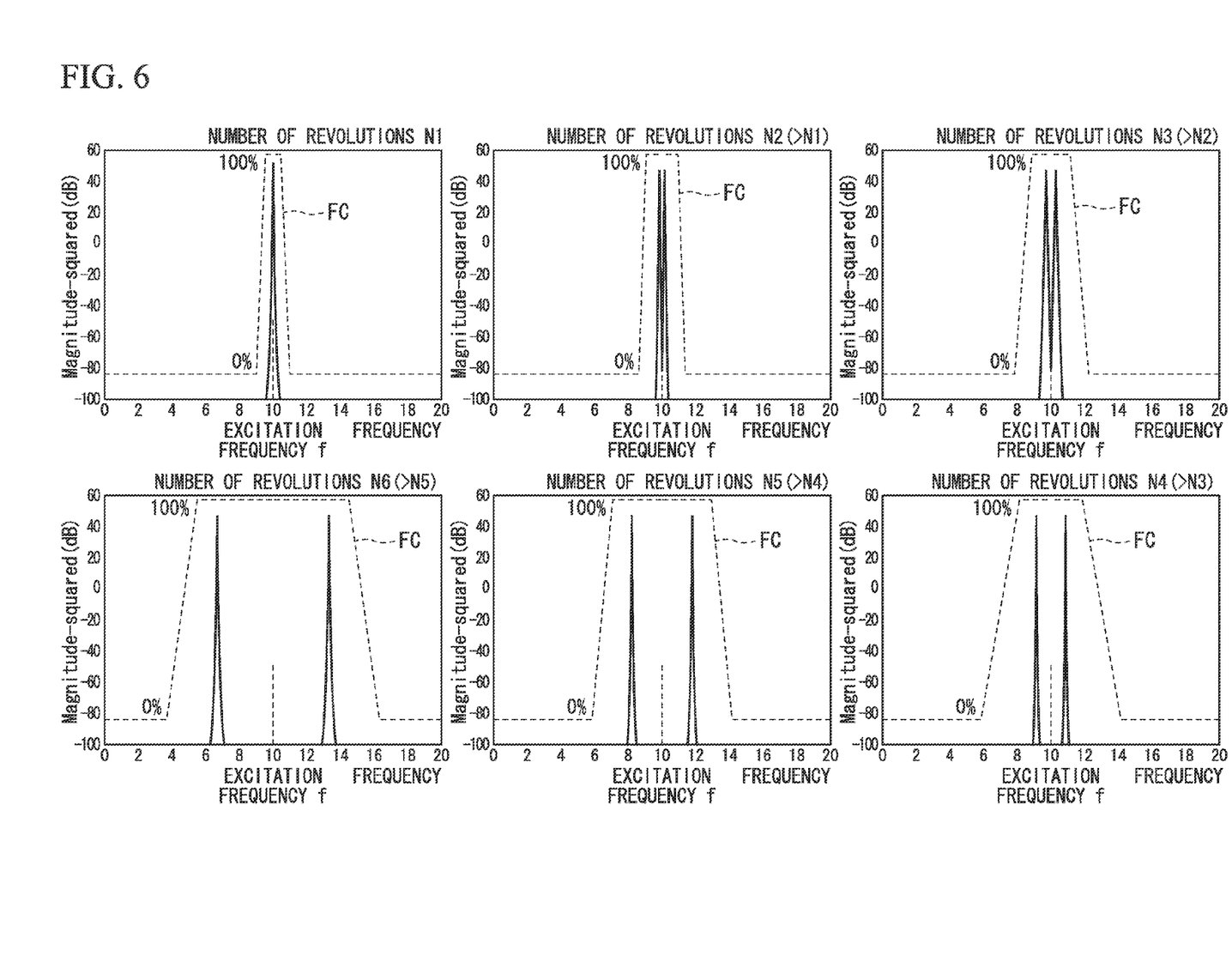
FIG. 6 is a diagram illustrating examples of changes in the excitation signal and filter characteristics FC according to an embodiment of the present invention in accordance with the number of revolutions.

In addition, the predetermined band in which passage is allowed in the band pass processing is a band that includes at least a frequency region (for example, a frequency region that changes to the increasing tendency in accordance with the number of revolutions) that changes in accordance with the number of revolutions of the rotary machine (not shown in the figure) as a detection target of the resolver 1. For example, as shown in FIG. 6, for an appropriate excitation frequency f of an excitation signal, each one of the resolver sine value signal and the resolver cosine value signal, which are detection signals output from the resolver 1, is divided into two frequency components that transit in the decreasing direction and the increasing direction of the frequency with the excitation frequency f set as a center frequency in accordance with an increase in the number of revolutions (for example, N1< . . . <N6). The predetermined band is set as a band that at least includes such two frequency components.

The filer characteristics of each one of the band pass filters 17 and 18, that is, changes in the passage ratio according to the frequency of each digital signal, for example, like the filter characteristics FC shown in FIG. 6, are set such that, from a predetermined band in which the passage ratio is 100%, the passage ratio changes in a decreasing trend from 100% toward 0% in accordance with a decrease in the frequency or an increase in the frequency.

The first maximum/minimum detecting circuit 19 detects a maximum value and a minimum value of the resolver sine value signal based on the digital signals of the resolver sine value signals that are sequential output from the first band pass filter 17; outputs a signal as the detection result; and inputs it to the processor 31. In addition, in a case where a signal is output from the processor 31 to be described later which directs the initialization of the detection result as the maximum value or the minimum value of the digital signal, the value of the digital signal output from the first band pass filter 17 at this time is set as the value of the maximum value or the minimum value as an initialization target.

The second maximum/minimum detecting circuit 20 detects a maximum value and a minimum value of the resolver cosine value signal based on the digital signals of the resolver cosine value signals that are sequential output from the second band pass filter 18; outputs a signal as the detection result; and inputs it to the processor 31. In addition, in a case where a signal is output from the processor 31 to be described later which directs the initialization of the detection result as the maximum value or the minimum value of the digital signal, the value of the digital signal output from the second band pass filter 18 at this time is set as the value of the maximum value or the minimum value as an initialization target.

The first multiplication unit 21 multiplies the digital signal of a resolver sine value signal (Bs) that is output from the first band pass filter 17 and a cosine value signal ($\cos(\phi+Pc)$) of a digital angle ($\phi+Pc$) that is converted by the cosine value converting unit 23 together. Then, the first multiplication unit 21 outputs the calculated first multiplication value signal, for example, a first multiplication value signal Cs, which is represented in the following Equation (3), and inputs a first multiplication value signal Cs to the subtraction unit 27.

The second multiplication unit 22 multiplies the digital signal of a resolver cosine value signal (Bc) that is output from the second band pass filter 18 and a sine value signal ($\sin(\phi+Ps)$) of a digital angle ($\phi+Pc$) that is converted by the sine value converting unit 24 together. Then, the second multiplication unit 22 outputs the calculated second multiplication value signal, for example, a second multiplication value signal Cc, which is represented in the following Equation (3), and inputs a second multiplication value signal Cc to the subtraction unit 27.

$$Cs=\cos(\phi+Pc)\cdot\sin(\theta+Ps)\cdot\sin \omega t \quad \text{[Equation 3]}$$

$$Cc=\cos(\theta+Pc)\cdot\sin(\phi+Ps)\cdot\sin \omega t \quad (3)$$

The cosine value converting unit 23 stores a predetermined COS table used for converting an acquired angle into a cosine value of the angle and converts a signal of a digital angle ($\phi+Pc$) output from the first addition unit 25 into a cosine value signal ($\cos(\phi+Pc)$). Then, the cosine value converting unit 23 outputs the cosine value signal ($\cos(\phi+Pc)$), and inputs it to the first multiplication unit 21.

The sine value converting unit 24 stores a predetermined SIN table used for converting an acquired angle into a sine value of the angle and converts a signal of a digital angle ($\phi+Pc$) output from the second addition unit 26 into a sine value signal ($\sin(\phi+Pc)$). Then, the sine value converting unit 24 outputs the sine value signal ($\sin(\phi+Pc)$), and inputs it to the second multiplication unit 22.

The first addition unit 25 adds the signal of the digital angle ($\phi$) that is output from the controller (control unit) 29 to be described later and the phase Pc that is output from the processor 31 to be described later together and outputs the signal of the calculated digital angle ($\phi+Pc$), and inputs it to the cosine value converting unit 23.

The second addition unit 26 adds the signal of the digital angle ($\phi$) that is output from the controller 29 to be described later and the phase Ps that is output from the processor 31 to be described later together and outputs the signal of the calculated digital angle ($\phi+Ps$), and inputs it to the sine value converting unit 24.

The subtraction unit 27 subtracts the second multiplication value signal, which is output from the second multiplication unit 22, from the first multiplication value signal which is output from the first multiplication unit 21; outputs a calculated subtraction value signal, for example, a subtraction value signal D represented in the following Equation (4); and inputs the subtraction value signal D to the synchronous detection circuit 28.

[Equation 4]

$$D=\sin(\theta-\phi)\cdot\cos(Ps-Pc)\cdot\sin \omega t \quad (4)$$

The synchronous detection circuit 28 performs a synchronous detection of the subtraction value signal output from the subtraction unit 27 by using an excitation signal in accordance with the result of the determination of the sign of the excitation signal that is output from the sign determining circuit 16 and outputs a detection signal E acquired through the synchronous detection. The detection signal E, for example, is represented by the following Equation (5).

The excitation signal input to the synchronous detection circuit 28 has a phase delay due to the band pass processing performed by the band pass filter 15. In addition, the subtraction value signal input from the subtraction unit 27 to the synchronous detection circuit 28 has a phase delay due to the band pass processing performed by the band pass filters 17 and 18. The phase shift is cancelled by the phase delay in the band pass filter 15 and the phase delays 17 and 18 in the band pass filters 17 and 18.

[Equation 5]

$$E = \sin(\theta - \phi) \cdot \cos(Ps - Pc) \quad (5)$$

The controller 29 adjusts such that the detection signal output from the synchronous detection circuit 28 is zero. In other words, the control unit 29 adjusts the digital angle ($\phi$) such that $\theta = \phi$ in Equation (5) described above and outputs a signal of the digital angle ($\phi$) acquired through the adjustment.

The delay correcting unit 30 corrects the signal of the digital angle. In other words, the delay correcting unit 30 adds the signal of the digital angle ($\phi$) output that is output from the controller 29 to a delay correction value $\alpha$ that is output from the processor 31 together and outputs a signal of the digital angle ($\theta a = \phi + \alpha$) acquired through the addition as a detection value of the rotation angle $\theta$.

The processor 31 calculates a gain correction value (1/Gs=1/(maximum value−minimum value)) based on the maximum value and the minimum value of the resolver sine value signal that is output from the first maximum/minimum detecting circuit 19; outputs the calculation result; and inputs it to the first band pass filter 17.

In addition, the processor 31 calculates a gain correction value (1/Gc=1/(maximum value−minimum value)) based on the maximum value and the minimum value of the resolver cosine value signal that is output from the second maximum/minimum detecting circuit 20; outputs the calculation result; and inputs it to the second band pass filter 18.

Furthermore, The processor 31 outputs signals directing to initialize the detection results of the maximum values or the minimum values of the digital signals of the resolver sine value signal and the resolver cosine value signal to the maximum/minimum detecting circuits 19 and 20.

In addition, the processor 31 outputs the phases Ps and Pc that are included in the detection signal output from the resolver 1 based on the digital angle ($\phi = \theta$) that is output from the controller 29.

Furthermore, the processor 31 stores delay correction values used for correcting the phase delays due to the band pass processing performed by the band pass filters 17 and 18 in accordance with the filter gains (in other words, the gain correction values (1/Gs) and (1/Gc)) in advance. For example, in a case where the band pass filters 17 and 18 are configured as the same band pass filters, the processor 31 outputs the same delay correction value $\alpha$ and inputs it to the delay correcting unit 30.

For example, as shown in FIG. 5, with respect to a maximum value MA of the resolver sine value signal that is output from the resolver 1, a maximum value MD of the resolver sine value signal after the band pass processing has a time delay due to the performing of the band pass processing. This time delay is corrected by correcting the digital angle ($\phi$) that is output from the controller 29 by using the delay correction value $\alpha$.

The resolver digital converter 10 according to this embodiment has the above-described configuration, and, next, the operation of the resolver digital converter 10 will be described.

Figure 7:
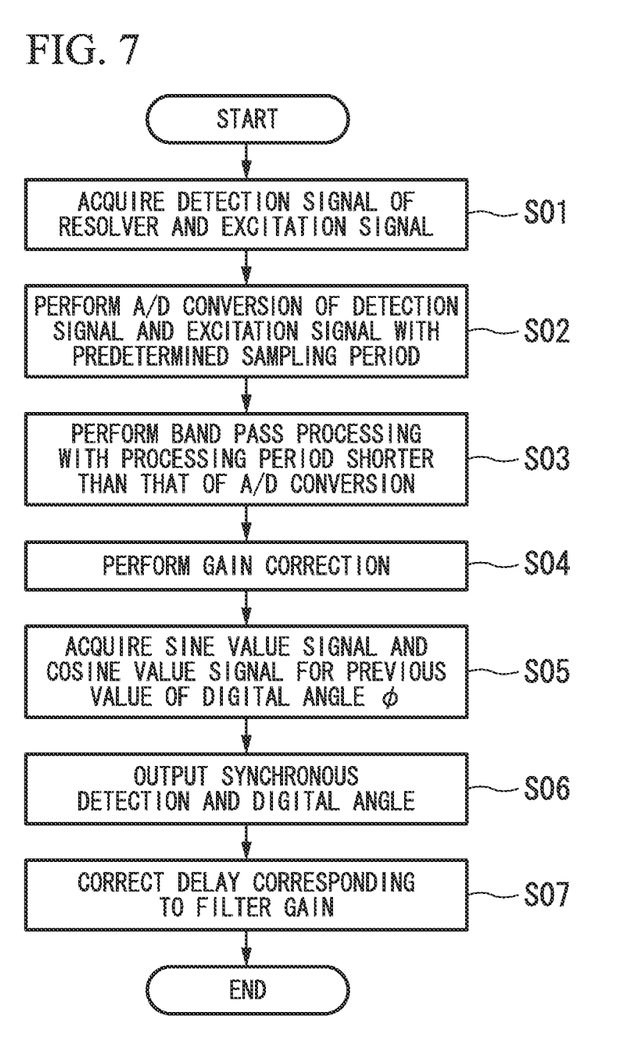
FIG. 7 is a flowchart illustrating the operation of the resolver digital converter according to the embodiment.

First, for example, in Step S01 shown in FIG. 7, a resolver sine value signal and a resolver cosine value signal that are analog signals output from the resolver 1 and an excitation signal that is an analog signal applied to the resolver 1 are acquired.

Next, in Step S02, the analog signals are converted (A/D conversion) into digital signals with a predetermined sampling period.

Next, in Step S03, band pass processing, in which only a signal of a predetermined band is passed, is performed for each digital signal with a period shorter than the sampling period of the A/D conversion. Particularly, in Step S03, DC components Os and Oc included in the digital signals of the resolver sine value signal and the resolver cosine value signal, that is, errors due to offsets included in the detection signals output from the resolver 1 are eliminated.

Next, in Step S04, gain correction by using the gain correction values (1/Gs) and (1/Gc) is performed for the digital signals of the resolver sine value signal and the resolver cosine value signal.

Next, in Step S05, a sine value signal and a cosine value signal that are based on the previous value of the digital angle ($\phi$) that is calculated in the previous processing are acquired.

Next, in Step S06, the resolver sine value signal (Bs) acquired by performing the band pass processing and the gain correcting process and the cosine value signal that is based on the previous value of the digital angle ($\phi$) are multiplied together so as to calculate a first multiplication value signal. In addition, in Step S06, the resolver cosine value signal (Bc) acquired by performing the band pass processing and the gain correcting process and the sine value signal that is based on the previous value of the digital angle ($\phi$) are multiplied together so as to calculate a second multiplication value signal. Furthermore, in Step S06, synchronous detection is performed for a subtraction value signal that is acquired by subtracting the second multiplication value signal from the first multiplication value signal by using the excitation signal, and a digital angle ($\phi$), which is adjusted such that a detection signal acquired through the synchronous detection is zero (in other words, $\theta = \phi$), is output.

Next, in Step S07, the delay correction value $\alpha$ that is stored in advance in accordance with the filter gain so as to correct the phase delays due to the band pass processing performed by the band pass filters 17 and 18 is acquired. The digital angle ($\phi$) is corrected by using the delay correction value $\alpha$, and the process ends.

As described above, according to the resolver digital converter 10 according to this embodiment, by performing band process processing, DC components included in digital signals that are output from the analog-to-digital (A/D) conversion circuit 14, that is, errors due to offsets included in the detection signals that are analog signals output from the resolver 1 can be appropriately eliminated.

In addition, by performing the band pass processing with a period that is shorter than the sampling period of the A/D conversion, even in a case where the reproducibility of the shapes of analog signals output from the resolver 1 is low in digital signals after the A/D conversion, the reproducibility of the shapes of analog signals output from the resolver 1 in the digital signals after the band pass processing can be improved.

Accordingly, the maximum value and the minimum value can be appropriately detected by using the digital signals of the resolver sine value signal and the resolver cosine value signal that are acquired through the band pass processing having high shape reproducibility. In addition, by using the maximum value and the minimum value having such high detection accuracy, the correction of the amplitude errors (in other words, the correction for the gains of digital signals) can be appropriately performed while securing appropriate accuracy. Thus, for example, it can be prevented to increase the cost required for configuring the device that is caused due to an increase in the accuracy that is necessary for devices such as the resolver 1 and the analog-to-digital (A/D) conversion circuit 14, accordingly the accuracy of the digital angle θa can be improved.

In addition, by correcting the delay that occurs through performing the band pass processing, the accuracy of the digital angle θa can be improved.

Furthermore, similarly to the detection signal output from the resolver 1, by performing the band pass processing also for the excitation signal, synchronous detection can be performed while resolving the phase deviation between the detection signal and the excitation signal, accordingly the accuracy of the digital angle θa can be improved.

As above, although the resolver digital converter 10 according to an embodiment of the present invention has been described, the present invention is not limited to this embodiment but can be appropriately changed in the range not departing from the technical concept of the present invention.

In the above-described embodiment, the band pass filter 15 for an excitation signal or the delay correcting unit 30 may be omitted. However, in a case where the band pass filter 15 for an excitation signal is included, similarly to the detection signal detected from the resolver 1, by performing the band pass processing also for the excitation signal, synchronous detection can be performed while resolving the phase deviation between the detection signal and the excitation signal, accordingly the accuracy of the digital angle can be improved.

In addition, in a case where the delay correcting unit 30 is included, by correcting the signal of the digital angle, the accuracy of the digital angle can be further improved.

Furthermore, although a configuration has been employed in which the first band pass filter 17 and the second band pass filter 18 also serve as correction units, the first and second band pass filters and the correction units may be separated arranged. In addition, it may be configured such that the processing unit 31 is omitted, and the process performed by the processing unit 31 is performed by the correction units, that is, the first band pass filter 17 and the second band pass filter 18.

In addition, although a configuration has been employed in which the first multiplication unit 21 and the second multiplication unit 22 are separated from each other, a configuration may be employed in which one multiplication unit calculates the first multiplication value signal and the second multiplication value signal.

REFERENCE SIGNS LIST 1 resolver
10 resolver digital converter
14 analog-to-digital (A/D) conversion circuit (analog-to-digital converter)
15 band pass filter (band pass processing unit)
17 first band pass filter (a band pass processing unit and a correction unit)
18 second band pass filter (a band pass processing unit and a correction unit)
23 cosine value converting unit (conversion unit)
24 sine value converting unit (conversion unit)
21 first multiplication unit (multiplication unit)
22 second multiplication unit (multiplication unit)
27 subtraction unit (subtraction unit)
28 synchronous detection circuit (synchronous detection unit)
29 controller (control unit)
30 delay correcting unit (delay correcting unit)
31 processor

The invention claimed is:

1. A resolver digital converter that converts a detection signal that is an analog signal output from a resolver that detects rotation of a rotor into a signal of a digital angle, the resolver digital converter comprising:
an analog-to-digital converter that converts a resolver sine value signal and a resolver cosine value signal, which are the detection signals, and an excitation signal of the resolver, which is an analog signal, into digital signals;
a conversion unit that converts the signal of the digital angle into a sine value signal and a cosine value signal;
a multiplication unit that calculates a first multiplication value signal by multiplying the resolver sine value signal converted into the digital signal by the analog-to-digital converter and the cosine value signal of the digital angle together and calculates a second multiplication value signal by multiplying the resolver cosine value signal converted into the digital signal by the analog-to-digital converter and the cosine value signal of the digital angle together;
a subtraction unit that calculates a subtraction value signal by subtracting the second multiplication value signal from the first multiplication value signal;
a synchronous detection unit that performs synchronous detection of the subtraction value signal by using the excitation signal and outputs a detection signal acquired through the synchronous detection;
a control unit that adjusts the digital angle such that the detection signal is zero;
a band pass processing unit that is disposed between the analog-to-digital converter and the multiplication unit and performs band pass processing, in which only a signal of a predetermined band out of the digital signal is passed, with a period that is shorter than a sampling period of the analog-to-digital converter; and
a correction unit that sets gain correction values based on a maximum value and a minimum value of each one of digital signals of the resolver sine value signal and the resolver cosine value signal that have passed the band pass processing unit, corrects gains of the digital signals of the resolver sine value signal and the resolver cosine value signal by using the gain correction values, and outputs the digital signals to the multiplication unit.

2. The resolver digital converter according to claim 1, wherein the band pass processing unit serves as the correction unit.

3. The resolver digital converter according to claim 1, further comprising a processing unit that sets the gain correction values.

4. The resolver digital converter according to claim 3, further comprising a delay correcting unit that corrects the signal of the digital angle by using a delay correction value, wherein the processing unit calculates the delay correction value corresponding to the gain correction values.

5. The resolver digital converter according to claim 1, further comprising a band pass processing unit for the excitation signal that is disposed between the analog-to-digital converter and the synchronous detection unit and performs band pass processing, in which only a signal of a predetermined band out of the excitation signal is passed, with a period that is shorter than the sampling period of the analog-to-digital converter.

* * * * *